United States Patent
Wang et al.

(10) Patent No.: US 11,424,450 B2
(45) Date of Patent: Aug. 23, 2022

(54) PRUSSIAN BLUE POSITIVE ELECTRODE MATERIAL, PREPARATION METHOD THEREFOR, AND ELECTROCHEMICAL ENERGY STORAGE DEVICE

(71) Applicant: CONTEMPORARY AMPEREX TECHNOLOGY CO., LIMITED, Ningde (CN)

(72) Inventors: Xiqing Wang, Ningde (CN); Yongsheng Guo, Ningde (CN); Chengdu Liang, Ningde (CN); Shuojian Su, Ningde (CN); Ying Wang, Ningde (CN)

(73) Assignee: CONTEMPORARY AMPEREX TECHNOLOGY CO., LIMITED, Fujian Province (CN)

( * ) Notice: Subject to any disclaimer, the term of this patent is extended or adjusted under 35 U.S.C. 154(b) by 344 days.

(21) Appl. No.: 16/684,213

(22) Filed: Nov. 14, 2019

(65) Prior Publication Data
US 2020/0083533 A1    Mar. 12, 2020

Related U.S. Application Data

(63) Continuation of application No. PCT/CN2017/084923, filed on May 18, 2017.

(51) Int. Cl.
*H01M 4/00* (2006.01)
*H01M 4/58* (2010.01)
(Continued)

(52) U.S. Cl.
CPC .............. *H01M 4/58* (2013.01); *C01C 3/11* (2013.01); *C01C 3/12* (2013.01); *H01M 10/054* (2013.01);
(Continued)

(58) Field of Classification Search
CPC .............. H01M 4/58; H01M 10/0535; H01M 2004/028; H01M 10/054; C01C 3/11; C01C 3/12
See application file for complete search history.

(56) References Cited

U.S. PATENT DOCUMENTS

| 9,099,740 B1 | 8/2015 | Motallebi et al. |
| 2009/0211494 A1 | 8/2009 | Kawamoto et al. |
| (Continued) | | |

FOREIGN PATENT DOCUMENTS

| CN | 105789690 A | 7/2016 |
| JP | H10 21898 A | 1/1998 |

OTHER PUBLICATIONS

Contemporary Amperex Technology Co., Limited, International Search Report and Written Opinion, PCT/CN2017/084923, dated Feb. 28, 2018, 15 pgs.
(Continued)

*Primary Examiner* — Cynthia H Kelly
*Assistant Examiner* — Monique M Wills
(74) *Attorney, Agent, or Firm* — Morgan, Lewis & Bockius LLP

(57) ABSTRACT

The present disclosure provides a prussian blue analogue positive electrode material, a preparation method therefor and an electrochemical energy storage device. A molecular formula of the prussian blue analogue positive electrode material is $A_xM_c[M'(CN)_6]_{1-y}(b\text{-}H_2O)_{6y-d}L_d \cdot \square_y \cdot (i\text{-}H_2O)_z$, where, A is one or more selected from a group consisting of alkali metal cation, alkaline-earth metal cation, $Zn^{2+}$ and $Al^{3+}$; M is a metal with the valence of 2+ or 3+; M' is a metal with the valence of 2+ or 3+; $b\text{-}H_2O$ is a coordinated water; $\square$ is a $M'(CN)_6$ cavity; L is a neutral ligand, the neutral ligand is one or more selected from a group consisting of $CH_3CN$, $NH_3$, CO and $C_5H_5N$; $i\text{-}H_2O$ is an interstitial water; $0<x\le 2$; $0<c\le 1$; $0<y<1$; $0<d\le 6y$; $0\le z\le 16$. In the prussian
(Continued)

blue analogue positive electrode material of the present disclosure, the neutral ligand L participates in the coordination with a transition metal and substitutes the coordinated water partly or wholly, so that a content of the coordinated water is decreased or even eliminated, therefore, the water absorption performance of the prussian blue analogue positive electrode material will be decreased significantly, in turn the performance of the electrochemical energy storage device is significantly improved.

14 Claims, 2 Drawing Sheets

(51) Int. Cl.
- *C01C 3/11* (2006.01)
- *C01C 3/12* (2006.01)
- *H01M 10/0525* (2010.01)
- *H01M 10/054* (2010.01)
- *H01M 4/02* (2006.01)

(52) U.S. Cl.
CPC ..... *H01M 10/0525* (2013.01); *C01P 2006/40* (2013.01); *H01M 2004/028* (2013.01)

(56) References Cited

U.S. PATENT DOCUMENTS

2015/0357630 A1 12/2015 Lu et al.
2018/0191033 A1* 7/2018 Wessells ........... H01M 10/0568

OTHER PUBLICATIONS

Contemporary Amperex Technology Co., Limited, The First Office Action, CN201710353220.6, dated Nov. 20, 2019, 9 pgs.
G. W. Beall, "Crystal Structure and Raman Spectral Study of Ligand Substitution in $Mn_3[CO(CN)_6]_2 \cdot XI$", Inorganic Chemistry Nov. 1, 1978, p. 2978-2981, American Chemical Society, U S A, vol. 17, No. 11, 4 pgs.
Kuperman Neal et al, "High performance Prussian Blue cathode for nonaqueous Ca-ion intercalation battery", Journal of Power Sources, Dec. 26, 2016, pp. 414-418, ISSN:0378-7753, Elsevier SA, CH, 5 pgs.
Kotaro Ogura et al, "Conversion of Carbon Monoxide into Methanol at Room Temperature and Atmospheric Pressure", Journal of the Chemical Society Faraday, Jan. 1, 1985, pp. 267-271, vol. 81, 5 pgs.
Contemporary Amperex Technology Co., Limited, Extended European Search Report, EP 17910424.5, dated May 6, 2020, 12 pgs.

* cited by examiner

PRUSSIAN BLUE POSITIVE ELECTRODE MATERIAL, PREPARATION METHOD THEREFOR, AND ELECTROCHEMICAL ENERGY STORAGE DEVICE

REFERENCE TO RELATED APPLICATIONS

This application is a continuation of PCT/CN2017/084923, filed on May 18, 2017, which is incorporated herein by reference in its entirety.

TECHNICAL FIELD

The present application relates to the field of energy storage device, and more specifically relates to a prussian blue analogue positive electrode material, a preparation method therefor and an electrochemical energy storage device.

BACKGROUND

A prussian blue analogue positive electrode material is commonly obtained by co-precipitating a transition metal cyanide anion ($M'(CN)_6^{m-}$) and a transition metal cation ($M^{n+}$) in an aqueous solution. Carbon ligands in cyanide groups complex with a transition metal M' to form a hexa-coordinate octahedral structure $M'(CN)_6$, un-coordinated nitrogen ligands in the $M'(CN)_6$ octahedron also complex with a transition metal M to form a hexa-coordinate octahedral structure $M(NC)_6$, therefore, the $M'(CN)_6$ octahedron and the $M(NC)_6$ octahedron connect alternately with each other and form a crystal structure of a three-dimensional skeleton (as shown in the left figure of FIG. 1). At the same time, a $M'(CN)_6$ cavity is easily formed in the crystal with the transition metal M, and the product has a very small solubility product constant ($K_{sp}$) in an aqueous solution, therefore, a precipitation will occur immediately once a transition metal cyanide anion ($M'(CN)_6^{m-}$) and a transition metal cation ($M^{n+}$) are mixed, so that the proportion of the $M'(CN)_6$ cavities in the crystal structure of the prussian blue analogue positive electrode material will still be very high.

As shown in the right figure of FIG. 1, in a unit in which a $M'(CN)_6$ cavity exists, a transition metal M only has five adjacent nitrogen ligands to coordinate therewith, and one coordinating site thereof left is coordinated by water (a coordinated water, also referred to as a bound water), then a $MN_5O$ octahedral structure is formed. In this way, six $MN_5O$ octahedrons which each contain the coordinated water will be formed around each $M'(CN)_6$ cavity; if the proportion of the $M'(CN)_6$ cavities is increased continuously, a $MN_4O_2$ octahedron may be formed. At the same time, a lattice water (also referred to as an interstitial water) also exists in a channel of a prussian blue analogue positive electrode material crystal structure. The interstitial water does not participate in the coordination with M, and may exist in the channel alone, or may form a hydrogen bond with a coordinated water.

A molecular formula of a prussian blue analogue positive electrode material crystal may be represented as $A_xM_c[M'(CN)_6]_{1-y}(b\text{-}H_2O)_{6y}\cdot\square_y\cdot(i\text{-}H_2O)_z$, where, A may be an alkali metal cation or an alkaline-earth metal cation; M and M' are transition metals and may be Mn, Fe, Co, Ni, Cu, Zn, Cr or the like; is a $M'(CN)_6$ cavity; $b\text{-}H_2O$ is a coordinated water; $i\text{-}H_2O$ is an interstitial water; $0 < c \leq 1$, $0 < x < 2$, $0 < y < 1$, $0 \leq z \leq 16$. Table 1 lists the proportion of $M'(CN)_6$ cavities in a prussian blue analogue positive electrode material crystal in different situations, where, the coordinated water and the interstitial water in a molecular formula are both omitted.

TABLE 1

Proportion of M'(CN)6 cavities in a prussian blue analogue positive electrode material crystal

| A | M | M' | M'(CN)$_6$ octahedron' electric charges | molecular formula of crystal | proportion of cavities |
|---|---|---|---|---|---|
|  | +2 valent | +2 valent | −4 valent | M[M'(CN)$_6$]$_{0.5}$●□$_{0.5}$ | 50% |
|  | +2 valent | +3 valent | −3 valent | M[M'(CN)$_6$]$_{0.67}$●□$_{0.33}$ | 33% |
|  | +3 valent | +2 valent | −4 valent | M[M'(CN)$_6$]$_{0.75}$●□$_{0.25}$ | 25% |
| +1 valent, x = 1.5 | +2 valent | +2 valent | −4 valent | A$_{1.5}$M[M'(CN)$_6$]$_{0.875}$●□$_{0.125}$ | 12.5% |
| +1 valent, x = 1.9 | +2 valent | +2 valent | −4 valent | A$_{1.9}$M[M'(CN)$_6$]$_{0.975}$●□$_{0.025}$ | 2.5% | of the prussian blue analogue positive electrode material (as shown in the right figure of FIG. 1) because of charge balance. For example, in a crystal of a prussian blue analogue positive electrode material which is obtained by co-precipitating a +2-valent transition metal cation $M^{2+}$ and a $[M'(CN)_6]^{4-}$ anion (in which the valence of M' is also +2) with four negative charges, a mole ratio of M to M' should be 2:1 to maintain charge balance, therefore, a proportion of the $M'(CN)_6$ cavities is up to 50% (see table 1).

When an alkali metal cation or an alkaline-earth metal cation exists in the crystal structure of the prussian blue analogue positive electrode material, because a cyanide group does not coordinate with such the metal cation, the alkali metal cation or the alkaline-earth metal cation can play a role of maintaining charge balance, thereby decreasing the proportion of the $M'(CN)_6$ cavities in the crystal structure of the prussian blue analogue positive electrode material. Even so, the un-coordinated nitrogen ligands in the $M'(CN)_6$ octahedron have very strong complex capability In a prussian blue analogue positive electrode material, an existence of each cavity forms six coordinated waters and leads to an increased water absorption performance of a positive electrode material. The interstitial water which exists in a channel of a prussian blue analogue positive electrode material crystal structure is easy to form a hydrogen bond with a coordinated water, thereby leading to an increased difficulty in interstitial water removal. If the interstitial water is not completely removed, the interstitial water will occupy some of the space in the channel of a prussian blue analogue positive electrode material crystal structure, block the transmission of an alkali metal or an alkaline-earth metal ion (such as $Na^+$ or $Li^+$). If the interstitial water is not completely removed, the interstitial water will dissociate into an electrolyte, and side reactions will occur between the interstitial water and the electrolyte, leading to consumption of the electrolyte, instability of a negative electrode SEI film and an increase of impedance, causing bad results (such as a decay of capacity and swelling, etc.) in an electrochemical energy storage device.

Therefore, how to remove the interstitial water has become one of main difficulties in forming a prussian blue analogue positive electrode material. Generally, powders of a prussian blue analogue positive electrode material or an electrode plate prepared by the prussian blue analogue positive electrode material are placed in a vacuum drying oven and heated under vacuum for a long time, so as to remove the interstitial water. However, after taken out from the vacuum drying oven, the powders of the prussian blue analogue positive electrode material or the electrode plate prepared by the prussian blue analogue positive electrode material will re-absorb the water in the air easily because of the strong water absorbability of the material. If the preparing process of the electrode material is performed in a drying room, the cost of the preparing process will increase greatly, and a mass production can not be performed.

SUMMARY

In view of the problems existing in the background of the present disclosure, an object of the present disclosure is to provide a prussian blue analogue positive electrode material, a preparation method therefor and an electrochemical energy storage device. In the prussian blue analogue positive electrode material, a neutral ligand participates in the coordination with a transition metal and substitutes the coordinated water partly or wholly, so that a content of the coordinated water is decreased or even eliminated, therefore, the water absorption performance of the prussian blue analogue positive electrode material will be decreased significantly, in turn the performance of the electrochemical energy storage device is significantly improved.

In order to achieve the above object, in a first aspect of the present disclosure, the present disclosure provides a prussian blue analogue positive electrode material, wherein a molecular formula of the prussian blue analogue positive electrode material is $A_xM_c[M'(CN)_6]_{1-y}(b\text{-}H_2O)_{6y-d}L_d \cdot \square_y \cdot (i\text{-}H_2O)_z$; where, A is one or more selected from a group consisting of alkali metal cation, alkaline-earth metal cation, $Zn^{2+}$ and $Al^{3+}$; M is a metal with the valence of 2+ or 3+; M' is a metal with the valence of 2+ or 3+; $b\text{-}H_2O$ is a coordinated water; $\square$ is a $M'(CN)_6$ cavity; L is a neutral ligand, the neutral ligand is one or more selected from a group consisting of $CH_3CN$, $NH_3$, CO and $C_5H_5N$; $i\text{-}H_2O$ is an interstitial water; $0<x\leq2$; $0<y<1$; $0<d\leq6y$; $0\leq z\leq16$.

In a second aspect of the present disclosure, the present disclosure provides a preparation method of a prussian blue analogue positive electrode material which comprises steps of: placing a positive electrode material with a molecular formula of $A_xM_c[M'(CN)_6]_{1-y}(b\text{-}H_2O)_{6y} \cdot \square_y \cdot (i\text{-}H_2O)_z$ which is prepared in advance into an environment of a neutral ligand L, then making ligand exchange performed to obtain a prussian blue analogue positive electrode material with a molecular formula of $A_xM_c[M'(CN)_6]_{1-y}(b\text{-}H_2O)_{6y-d}L_d \cdot \square_y \cdot (i\text{-}H_2O)_z$; where, A is one or more selected from a group consisting of alkali metal cation, alkaline-earth metal cation, $Zn^{2+}$ and $Al^{3+}$; M is a metal with the valence of 2+ or 3+; M' is a metal with the valence of 2+ or 3+; $b\text{-}H_2O$ is a coordinated water; $\square$ is a $M'(CN)_6$ cavity; L is the neutral ligand, the neutral ligand is one or more selected from a group consisting of $CH_3CN$, $NH_3$, CO and $C_5H_5N$; $i\text{-}H_2O$ is an interstitial water; $0<x\leq2$; $0<c\leq1$; $0<y<1$; $0<d\leq6y$; $0\leq z\leq16$.

In a third aspect of the present disclosure, the present disclosure provides another preparation method of a prussian blue analogue positive electrode material which comprises steps of: making a cyanide anion of transition metal M' and a cation of transition metal M in an environment of a neutral ligand L perform co-precipitation reaction to obtain a prussian blue analogue positive electrode material with a molecular formula of $A_xM_c[M'(CN)_6]_{1-y}(b\text{-}H_2O)_{6y-d}L_d \cdot \square_y \cdot (i\text{-}H_2O)_z$; where, A is one or more selected from a group consisting of alkali metal cation, alkaline-earth metal cation, $Zn^{2+}$ and $Al^{3+}$; M is a metal with the valence of 2+ or 3+; M' is a metal with the valence of 2+ or 3+; $b\text{-}H_2O$ is a coordinated water; $\square$ is a $M'(CN)_6$ cavity; L is the neutral ligand, the neutral ligand is one or more selected from a group consisting of $CH_3CN$, $NH_3$, CO and $C_5H_5N$; $i\text{-}H_2O$ is an interstitial water; $0<x\leq2$; $0<c\leq1$; $0<y<1$; $0\leq d\leq6y$; $0\leq z\leq16$.

In a fourth aspect of the present disclosure, the present disclosure provides an electrochemical energy storage device which comprises: a positive electrode plate comprising a positive electrode current collector and a positive electrode film which is provided to the positive electrode current collector and contains a positive electrode material; a negative electrode plate; and a separator; wherein, the positive electrode material comprises the prussian blue analogue positive electrode material according to the first aspect of the present disclosure.

Compared to the technologies in the background, the present disclosure has the following beneficial effects.

In the prussian blue analogue positive electrode material of the present disclosure, a neutral ligand participates in the coordination with a transition metal and substitutes the coordinated water partly or wholly, so that a content of the coordinated water is decreased or even eliminated, therefore, the water absorption performance of the prussian blue analogue positive electrode material will be decreased significantly, in turn the performance of the electrochemical energy storage device is significantly improved.

BRIEF DESCRIPTION OF THE DRAWINGS

In FIG. 1 and FIG. 2, a gray larger globe represents a metal M, a black larger globe represent a metal M', a gray smaller globe represents a carbon atom, a black smaller globe represents a nitrogen atom.

DETAILED DESCRIPTION

Figure 1:
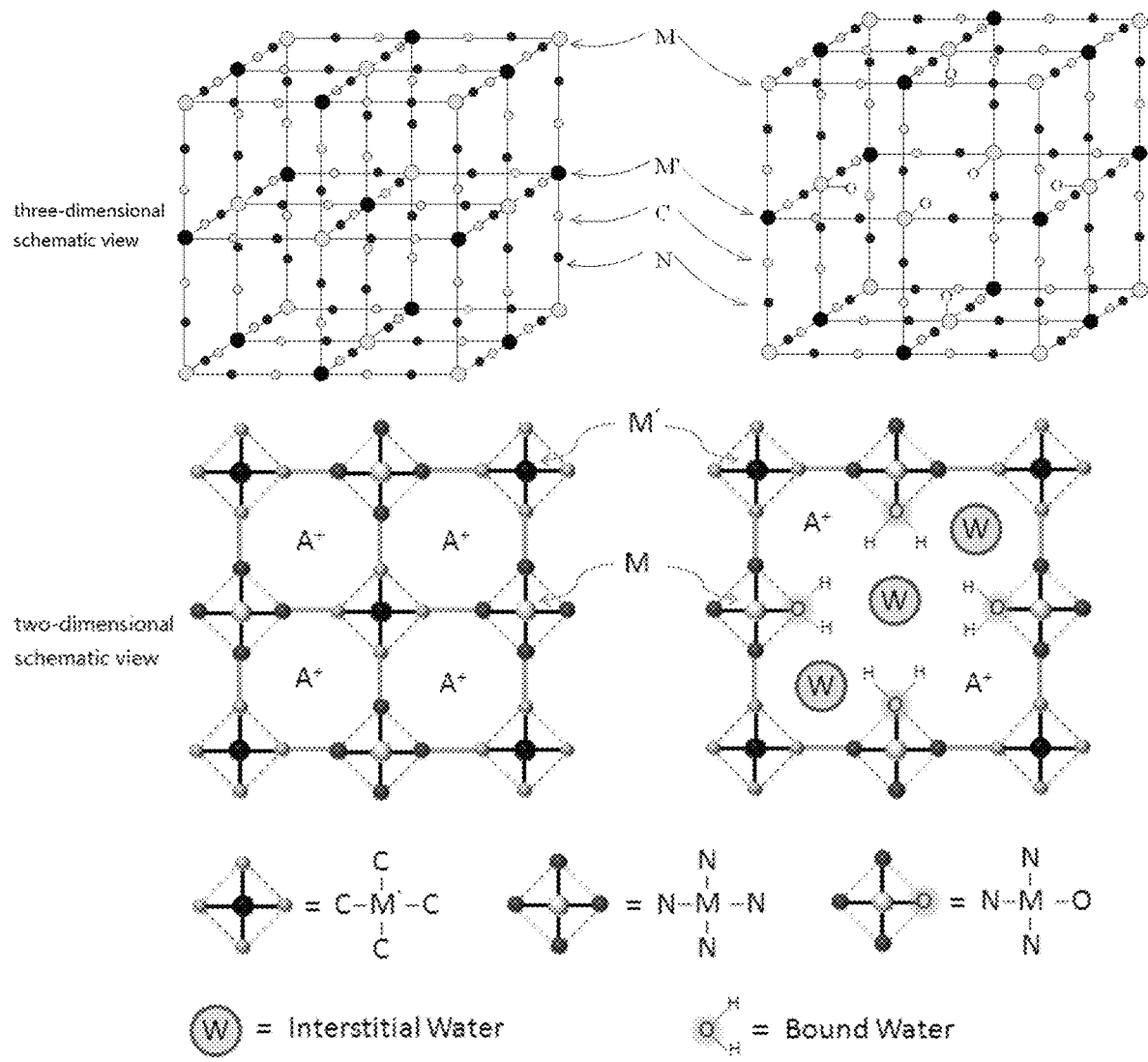
FIG. 1 is a schematic view illustrating a crystal structure of a prussian blue analogue positive electrode material.

Hereinafter a prussian blue analogue positive electrode material, a preparation method therefor and an electrochemical energy storage device according to the present disclosure will be described in detail.

Firstly, a prussian blue analogue positive electrode material according to a first aspect of the present disclosure is described. A molecular formula of the prussian blue analogue positive electrode material is $A_xM_c[M'(CN)_6]_{1-y}(b\text{-}H_2O)_{6y-d}L_d \cdot \square_y \cdot (i\text{-}H_2O)_z$; where, A is one or more selected from a group consisting of alkali metal cation, alkaline-earth metal cation, $Zn^{2+}$ and $Al^{3+}$; M is a metal with the valence of 2+ or 3+; M' is a metal with the valence of 2+ or 3+; $b\text{-}H_2O$ is a coordinated water; $\square$ is a $M'(CN)_6$ cavity; L is a neutral ligand, the neutral ligand is one or more selected from a group consisting of $CH_3CN$, $NH_3$, CO and $C_5H_5N$; $i\text{-}H_2O$ is an interstitial water; $0<x\leq2$; $0<c\leq1$; $0<y<1$; $0<d\leq6y$; $0\leq z\leq16$.

In the prussian blue analogue positive electrode material according to the first aspect of the present disclosure, the neutral ligand L participates in the coordination with a transition metal and substitutes the coordinated water $b\text{-}H_2O$ partly or wholly, so that a content of the coordinated water $b\text{-}H_2O$ is decreased or even eliminated, therefore, the water absorption performance of the prussian blue analogue positive electrode material will be decreased significantly. The interstitial water $i\text{-}H_2O$ in the prussian blue analogue positive electrode material is more easily to be removed through a heating process (for example, the interstitial water $i\text{-}H_2O$ in the prussian blue analogue positive electrode material is removed together in a drying process of a positive electrode slurry), and will not influence the transmission of A-ion (A-ion is one or more selected from a group consisting of alkali metal cation, alkaline-earth metal cation, $Zn^{2+}$ and $Al^{3+}$), meanwhile will reduce the negative effect brought by the existence of the interstitial water $i\text{-}H_2O$, for example, the interstitial water $i\text{-}H_2O$ will dissociate into an electrolyte and influence the performance of the electrochemical energy storage device.

In the prussian blue analogue positive electrode material according to the first aspect of the present disclosure, preferably, A may be one or more selected from a group consisting of $Li^+$, $Na^+$, $K^+$, $Ca^{2+}$, $Mg^{2+}$, $Zn^{2+}$ and $Al^{3+}$.

In the prussian blue analogue positive electrode material according to the first aspect of the present disclosure, preferably, M may be a transition metal, further preferably, M may be one or more selected from a group consisting of Ti, V, Cr, Mn, Fe, Co, Ni, Cu, Zn, Nb, Ru, Sn, In and Cd.

In the prussian blue analogue positive electrode material according to the first aspect of the present disclosure, preferably, M' may be a transition metal, further preferably, M' may be one or more selected from a group consisting of Ti, V, Cr, Mn, Fe, Co, Ni, Cu, Zn, Nb, Ru, Sn, In and Cd.

Figure 2:
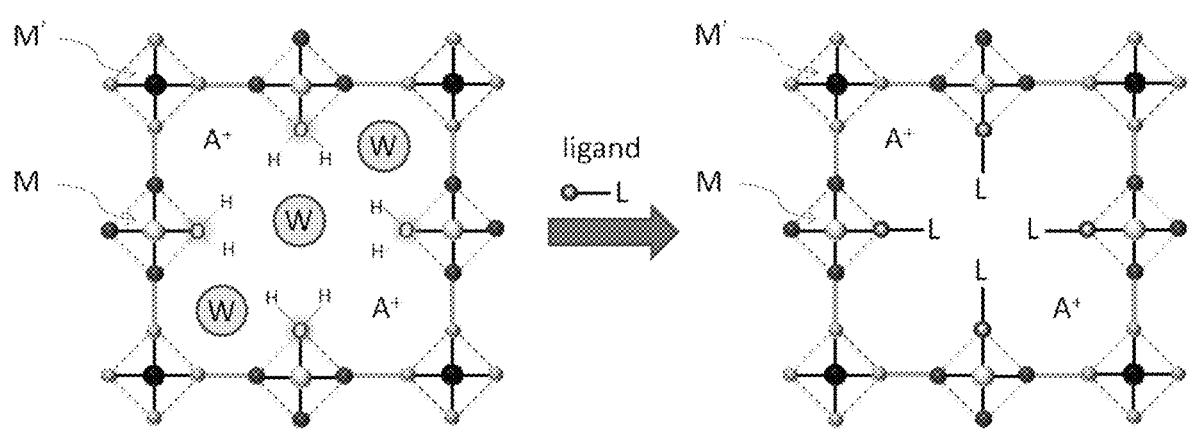
FIG. 2 is a schematic view illustrating an exchange of ligands of a prussian blue analogue positive electrode material.

Secondly, a preparation method of a prussian blue analogue positive electrode material according to a second aspect of the present disclosure is described, is for preparing the prussian blue analogue positive electrode material according to the first aspect of the present disclosure, and comprises steps of: placing a positive electrode material with a molecular formula of $A_xM_c[M'(CN)_6]_{1-y}(b\text{-}H_2O)_{6y}\cdot\square_y\cdot(i\text{-}H_2O)$, which is prepared in advance into an environment of a neutral ligand L, then making ligand exchange performed to obtain a prussian blue analogue positive electrode material with a molecular formula of $A_xM_c[M'(CN)_6]_{1-y}(b\text{-}H_2O)_{6y-d}L_d\cdot\square_y\cdot(i\text{-}H_2O)_z$; where, A is one or more selected from a group consisting of alkali metal cation, alkaline-earth metal cation, $Zn^{2+}$ and $Al^{3+}$; M is a metal with the valence of 2+ or 3+; M' is a metal with the valence of 2+ or 3+; $b\text{-}H_2O$ is a coordinated water; $\square$ is a $M'(CN)_6$ cavity; L is a neutral ligand, the neutral ligand is one or more selected from a group consisting of $CH_3CN$, $NH_3$, CO and $C_5H_5N$; $i\text{-}H_2O$ is an interstitial water; $0<x\le2$; $0<c<1$; $0<y<1$; $0<d\le6y$; $0\le z\le16$. Referring to FIG. 2, after the ligand exchange, the coordinated water $b\text{-}H_2O$ is partly or wholly substituted by the neutral ligand L.

In the preparation method of the prussian blue analogue positive electrode material according to the second aspect of the present disclosure, the environment of the neutral ligand L may be a solution containing the neutral ligand L or a gas containing the neutral ligand L. The solution containing the neutral ligand L may be a liquid formed by neutral ligand L itself, an aqueous solution containing the neutral ligand L or a mixed solution of water and an organic solvent containing the neutral ligand L. The organic solvent may be one or more selected from a group consisting of methanol, ethanol, acetone, DMF, DMSO, tetrahydrofuran, n-propanol, isopropanol, ethylene glycol and propylene glycol. The gas containing the neutral ligand L may be a gas formed just by the neutral ligand L itself or a mixed gas formed by the neutral ligand L and an inert gas. The inert gas may be one or more selected from a group consisting of $N_2$, $CO_2$, Ar and He.

In the preparation method of the prussian blue analogue positive electrode material according to the second aspect of the present disclosure, $A_xM_c[M'(CN)_6]_{1-y}(b\text{-}H_2O)_{6y}\cdot\square_y\cdot(i\text{-}H_2O)$, may be prepared by a conventional co-precipitation reaction.

Thirdly, a preparation method of a prussian blue analogue positive electrode material according to a third aspect of the present disclosure is described, is for preparing the prussian blue analogue positive electrode material according to the first aspect of the present disclosure, and comprises steps of: making a cyanide anion of the transition metal M' and a cation of the transition metal M in an environment of the neutral ligand L perform co-precipitation reaction to obtain a prussian blue analogue positive electrode material with a molecular formula of $A_xM_c[M'(CN)_6]_{1-y}(b\text{-}H_2O)_{6y-d}L_d\cdot\square_y\cdot(i\text{-}H_2O)_z$; where, A is one or more selected from a group consisting of alkali metal cation, alkaline-earth metal cation, $Zn^{2+}$ and $Al^{3+}$; M is a metal with the valence of 2+ or 3+; M' is a metal with the valence of 2+ or 3+; $b\text{-}H_2O$ is a coordinated water; $\square$ is a $M'(CN)_6$ cavity; L is a neutral ligand, the neutral ligand is one or more selected from a group consisting of $CH_3CN$, $NH_3$, CO and $C_5H_5N$; $H_2O$ is an interstitial water; $0<x\le2$; $0<c\le1$; $0<y<1$; $0<d\le6y$; $0\le z\le16$. Referring to FIG. 2, after co-precipitating in a solution containing neutral ligand L, the coordinated water $b\text{-}H_2O$ is partly or wholly substituted by the neutral ligand L.

In the preparation method of the prussian blue analogue positive electrode material according to the third aspect of the present disclosure, the environment of the neutral ligand L may be a solution containing the neutral ligand L or a gas containing the neutral ligand L. The solution containing neutral ligand L may be a liquid formed by the neutral ligand L itself, an aqueous solution containing the neutral ligand L and a mixed solution of water and an organic solvent containing the neutral ligand L. The organic solvent may be one or more selected from a group consisting of methanol, ethanol, acetone, DMF, DMSO, tetrahydrofuran, n-propanol, isopropanol, ethylene glycol and propylene glycol. The gas containing neutral ligand L may be a gas formed just by the neutral ligand L itself or a mixed gas formed by the neutral ligand L and an inert gas. The inert gas may be one or more selected from a group consisting of $N_2$, $CO_2$, Ar and He.

Finally, an electrochemical energy storage device according to a fourth aspect of the present disclosure is described, and comprises a positive electrode plate, a negative electrode plate and a separator. The positive electrode plate comprises a positive electrode current collector and a positive electrode film which is provided to the positive electrode current collector and contains a positive electrode material. The positive electrode material comprises the prussian blue analogue positive electrode material according to the first aspect of the present disclosure.

In the electrochemical energy storage device according to the fourth aspect of the present disclosure, the electrochemical energy storage device may be a lithium-ion battery, a sodium-ion battery, a potassium-ion battery, zinc-ion battery or an aluminum-ion battery. The prussian blue analogue positive electrode material according to the first aspect of the present disclosure is a prussian blue analogue positive electrode material containing a A-ion which is used to improve the performance of the corresponding electrochemical energy storage device containing the A-ion, where, the A-ion is one or more selected from a group consisting of alkali metal cation, alkaline-earth metal cation, $Zn^{2+}$ and $Al^{3+}$.

In the electrochemical energy storage device according to the fourth aspect of the present disclosure, the negative electrode plate may comprise a negative electrode current collector and a negative electrode film which is provided to the negative electrode current collector and contains a negative electrode material, and the negative electrode material is one or more selected from a group consisting of carbon based material and silicon based material.

In the electrochemical energy storage device according to the fourth aspect of the present disclosure, the negative electrode plate may also be an A metal or an A metal alloy, where, A is one or more selected from a group consisting of alkali metal, alkaline-earth metal, Zn and Al.

Hereinafter the present disclosure will be described in detail in combination with examples. It should be noted that, the examples described in the present disclosure are only used for explaining the present disclosure, and are not intended to limit the scope of the present disclosure.

Comparative Example 1

A solution (1) was obtained by dissolving appropriate amount of $Na_4Fe(CN)_4$ into appropriate amount of deionized water, a solution (2) was obtained by dissolving appropriate amount of $MnCl_2$ into appropriate amount of deionized water, then the solution (2) was slowly added into the solution (1) under mixing operation, mixing was then performed for 24 h, then after filtering and drying, a sample needed was obtained. The test results of ICP and TG indicated that the molecular formula of the sample was $Na_{1.85}Mn[Fe(CN)_6]_{0.96}(b\text{-}H_2O)_{0.24}\cdot\square_{0.04}(i\text{-}H_2O)_{1.61}$.

Comparative Example 2

A solution (1) was obtained by dissolving appropriate amount of $Na_4Fe(CN)_4$ into appropriate amount of deionized water, a solution (2) was obtained by dissolving appropriate amount of $FeCl_2$ into appropriate amount of deionized water, then the solution (2) was slowly added into the solution (1) under mixing operation, mixing was then performed for 24 h, then after filtering and drying, a sample needed was obtained, where, an inert gas was used for protection in the synthetic process, so that $Fe^{2+}$ was prevented from being oxidized. The test results of ICP and TG indicated that the molecular formula of the sample was $Na_{1.58}Fe[Fe(CN)_6]_{0.09}(b\text{-}H_2O)_{0.60}\cdot\square_{0.10}\cdot(i\text{-}H_2O)_{1.34}$.

Comparative Example 3

A solution (1) was obtained by dissolving appropriate amount of $K_4Fe(CN)_4$ into appropriate amount of deionized water, a solution (2) was obtained by dissolving appropriate amount of $MnCl_2$ into appropriate amount of deionized water, then the solution (2) was slowly added into the solution (1) under mixing operation, mixing was then performed for 24 h, then after filtering and drying, a sample needed was obtained. The test results of ICP and TG indicated that the molecular formula of the sample was $K_{1.33}Mn[Fe(CN)_6]_{0.82}(b\text{-}H_2O)_{1.08}\cdot\square_{0.18}(i\text{-}H_2O)_{2.58}$.

Example 1

Appropriate amount of the sample obtained in comparative example 1 was taken and uniformly mixed with appropriate amount of solution of acetonitrile ($CH_3CN$), mixing was then performed under room temperature for 12 h for ligand exchange, then after filtering and drying which were performed after exchange, an acetonitrile-exchanged sample was obtained, of which the molecular formula was $Na_{1.85}Mn[Fe(CN)_6]_{0.96}(b\text{-}H_2O)_{0.24\text{-}d1}(CH_3CN)_{d1}\cdot\square_{0.04}\cdot(i\text{-}H_2O)_{1.61}$, $0<d1<0.24$.

Example 2

A solution (1) was obtained by dissolving appropriate amount of $Na_4Fe(CN)_4$ into 20% ammonium hydroxide, a solution (2) was obtained by dissolving $MnCl_2$ which had an equal ratio into appropriate amount of deionized water, then the solution (2) was slowly added into the solution (1) under mixing operation, mixing was then performed for 24 h, then after filtering and drying, a sample whose molecular formula was $Na_{1.85}Mn[Fe(CN)_6]_{0.96}(b\text{-}H_2O)_{0.24\text{-}d2}(NH_3)_{d2}\cdot\square_{0.04}\cdot(i\text{-}H_2O)_{1.61}$, $0<d2<0\ 0.24$ was obtained, where, the sample was obtained by co-precipitating in an solution of ammonium hydroxide and exchanging with $NH_3$.

Example 3

Appropriate amount of the sample obtained in comparative example 2 was taken and uniformly mixed with appropriate amount of solution of acetonitrile, mixing was then performed under room temperature for 12 h for ligand exchange, then after filtering and drying which were performed after exchange, an acetonitrile-exchanged sample was obtained, of which the molecular formula was $Na_{1.58}Fe[Fe(CN)_6]_{0.90}(b\text{-}H_2O)_{0.60\text{-}d3}(CH_3CN)_{d3}\cdot\square_{0.10}\cdot(i\text{-}H_2O)_{1.34}$, $0<d3<0.60$.

Example 4

Appropriate amount of the sample obtained in comparative example 3 was taken and uniformly mixed with appropriate amount of solution of acetonitrile, mixing was then performed under room temperature for 12 h for ligand exchange, then after filtering and drying which were performed after exchange, an acetonitrile-exchanged sample was obtained, of which the molecular formula was $K_{1.33}Mn[Fe(CN)_6]_{0.82}(b\text{-}H_2O)_{1.08\text{-}d4}(CH_3CN)_{d4}\cdot\square_{0.18}(i\text{-}H_2O)_{2.58}$, $0<d4<1.08$.

In order to test the water absorption performance of the prussian blue analogue positive electrode material, the sample in all examples and comparative examples were dried for 12 h at 120° C., then the dried sample was divided into two groups (a first group and a second group), the water content of the first group was tested using Karl Fischer Moisture Titrator immediately, and the water content of the second group was tested using Karl Fischer Moisture Titrator after placed in the air for 1 h. The test cut-off temperature of the water content is 170° C.

TABLE 2

Test results of the water content of examples 1-4 and comparative examples 1-3

| sample | water content of the first group/ppm | water content of the second group/ppm |
|---|---|---|
| Example 1 | 1044 | 3157 |
| Example 2 | 1287 | 3573 |
| Example 3 | 2252 | 6100 |
| Example 4 | 2309 | 6901 |

TABLE 2-continued

Test results of the water content of examples
1-4 and comparative examples 1-3

| sample | water content of the first group/ppm | water content of the second group/ppm |
|---|---|---|
| Comparative example 1 | 2311 | 8091 |
| Comparative example 2 | 3296 | 10372 |
| Comparative example 3 | 3583 | 15928 |

It could be seen from a comparison between the test results of the water content of examples 1-2 and comparative example 1, $Na_{1.85}Mn[Fe(CN)_6]_{0.96}(b-H_2O)_{0.24}\cdot\square_{0.04}(i-H_2O)_{1.61}$ still contained 2311 ppm water after drying at 120° C. for 12 h, and had particularly strong water absorption performance, the water content thereof increased to 8091 ppm after placed in the air for 1 h; however, in example 1, after exchanged by acetonitrile, a part of the coordinated water of the sample was substituted by acetonitrile, then the sample became $Na_{1.85}Mn[Fe(CN)_6]_{0.96}(b-H_2O)_{0.24-d1}(CH_3CN)_{d1}\cdot\square_{0.04}\cdot(i-H_2O)_{1.61}$, of which the water content decreased from 2311 ppm to 1044 ppm after drying at 120° C. for 12 h, and of which the water content was just 3157 ppm after placed in the air for 1 h, therefore, it indicated that the water absorption performance of the prussian blue analogue positive electrode material which contained sodium and was obtained in example 1 was greatly decreased; however, in example 2, when co-precipitating in an solution of ammonium hydroxide and synthesizing, a part of the coordinated water of the sample was substituted by $NH_3$ which entered into the crystal structure of the prussian blue analogue positive electrode material, then the sample became $Na_{1.85}Mn[Fe(CN)_6]_{0.96}(b-H_2O)_{0.24-d2}(NH_3)_{d2}\cdot\square_{0.04}\cdot(i-H_2O)_{1.61}$, of which the water content decreased from 2311 ppm to 1287 ppm after drying at 120° C. for 12 h, and of which the water content was just 3573 ppm after placed in air for 1 h, therefore, it indicated that the water absorption performance of the prussian blue analogue positive electrode material which contained sodium and was obtained in example 2 was greatly decreased.

It could be seen from a comparison between the test results of the water content of example 3 and comparative example 2, $Na_{1.58}Fe[Fe(CN)_6]_{0.90}(b-H_2O)_{0.60}\cdot\square_{0.10}\cdot(i-H_2O)_{1.34}$ still contained 3296 ppm water after drying at 120° C. for 12 h, and had particularly strong water absorption performance, the water content thereof increased to 10372 ppm after placed in air for 1 h; however, in example 3, after exchanged by acetonitrile, a part of the coordinated water of the sample was substituted by acetonitrile, then the sample became $Na_{1.58}Fe[Fe(CN)_6]_{0.90}(b-H_2O)_{0.60-d3}(CH_3CN)_{d3}\cdot\square_{0.10}\cdot(i-H_2O)_{1.34}$, of which the water content decreased from 3296 ppm to 2252 ppm after drying at 120° C. for 12 h, and of which the water content was just 6100 ppm after placed in the air for 1 h, therefore, it indicated that the water absorption performance of the prussian blue analogue positive electrode material which contained sodium and was obtained in example 3 was greatly decreased.

It could be seen from a comparison between the test results of the water content of examples 4 and comparative examples 3, $K_{1.33}Mn[Fe(CN)_6]_{0.82}(b-H_2O)_{1.08}\cdot\square_{0.18}(i-H_2O)_{2.58}$ still contained 3583 ppm water after drying at 120° C. for 12 h, and had particularly strong water absorption performance, the water content thereof increased to 15928 ppm after placed in the air for 1 h; however, in example 4, after exchanged by acetonitrile, a part of the coordinated water of the sample was substituted by acetonitrile, then the sample became $K_{1.33}Mn[Fe(CN)_6]_{0.82}(b-H_2O)_{1.08-d4}(CH_3CN)_{d4}\cdot\square_{0.18}\cdot(i-H_2O)_{2.58}$, of which the water content decreased from 3583 ppm to 2309 ppm after drying at 120° C. for 12 h, and of which the water content was just 6901 ppm after placed in the air for 1 h, therefore, it indicated that the water absorption performance of the prussian blue analogue positive electrode material which contained potassium and was obtained in example 4 was greatly decreased.

In conclusion, the neutral ligand L was introduced into the prussian blue analogue positive electrode material of the present disclosure, then the coordinated water $b-H_2O$ was substituted partly or wholly by the neutral ligand L, so that a content of the coordinated water $b-H_2O$ in a prussian blue analogue positive electrode material was decreased or even eliminated, and the water absorption performance of the prussian blue analogue positive electrode material was decreased significantly.

What is claimed is:

1. A prussian blue analogue positive electrode material, wherein
   a molecular formula of the prussian blue analogue positive electrode material is $A_xM_c[M'(CN)_6]_{1-y}(b-H_2O)_{6y-d}L_d\cdot(i-H_2O)_z$;
   where,
   A is one or more selected from a group consisting of alkali metal cation, alkaline-earth metal cation, $Zn^{2+}$ and $Al^{3+}$;
   M is a metal with the valence of 2+ or 3+;
   M' is a metal with the valence of 2+ or 3+;
   $b-H_2O$ is a coordinated water;
   L is a neutral ligand, the neutral ligand is one or more selected from a group consisting of $CH_3CN$, $NH_3$, CO and $C_5H_5N$;
   $i-H_2O$ is an interstitial water;
   $0<x\leq2$;
   $0<c\leq1$;
   $0<y<1$;
   $0<d\leq6y$;
   $0\leq z\leq16$.

2. The prussian blue analogue positive electrode material according to claim 1, wherein A is one or more selected from a group consisting of $Li^+$, $Na^+$, $K^+$, $Ca^{2+}$, $Mg^{2+}$, $Zn^{2+}$ and $Al^{3+}$.

3. The prussian blue analogue positive electrode material according to claim 1, wherein M is a transition metal.

4. The prussian blue analogue positive electrode material according to claim 3, wherein M is one or more selected from a group consisting of Ti, V, Cr, Mn, Fe, Co, Ni, Cu, Zn, Nb, Ru, Sn, In and Cd.

5. The prussian blue analogue positive electrode material according to claim 1, wherein M' is a transition metal.

6. The prussian blue analogue positive electrode material according to claim 5, wherein M' is one or more selected from a group consisting of Ti, V, Cr, Mn, Fe, Co, Ni, Cu, Zn, Nb, Ru, Sn, In and Cd.

7. A preparation method of a prussian blue analogue positive electrode material for preparing the prussian blue analogue positive electrode material according to claim 1, comprising steps of:
   placing a positive electrode material with a molecular formula of $A_xM_c[M'(CN)_6]_{1-y}(b-H_2O)_{6y-d}(i-H_2O)_z$ which is prepared in advance into an environment of a neutral ligand L, then making ligand exchange performed to obtain a prussian blue analogue positive electrode material with a molecular formula of $A_xM_c[M'(CN)_6]_{1-y}(b-H_2O)_{6y-d}L_d(i-H_2O)_z$;

where,

A is one or more selected from a group consisting of alkali metal cation, alkaline-earth metal cation, $Zn^{2+}$ and $Al^{3+}$;

M is a metal with the valence of 2+ or 3+;

M' is a metal with the valence of 2+ or 3+;

$b\text{-}H_2O$ is a coordinated water;

L is the neutral ligand, the neutral ligand is one or more selected from a group consisting of $CH_3CN$, $NH_3$, CO and $C_5H_5N$;

$i\text{-}H_2O$ is an interstitial water;

$0<x\leq2$;

$0<c\leq1$;

$0<y<1$;

$0<d\leq6y$;

$0\leq z\leq16$.

8. The preparation method of the prussian blue analogue positive electrode material according to claim 7, wherein the environment of the neutral ligand L is a solution containing the neutral ligand L or a gas containing the neutral ligand L.

9. The preparation method of the prussian blue analogue positive electrode material according to claim 8, wherein the solution containing the neutral ligand L is a liquid formed by the neutral ligand L itself, an aqueous solution containing the neutral ligand L or a mixed solution of water and an organic solvent containing the neutral ligand L.

10. The preparation method of the prussian blue analogue positive electrode material according to claim 9, wherein the organic solvent is one or more selected from a group consisting of methanol, ethanol, acetone, DMF, DMSO, tetrahydrofuran, n-propanol, isopropanol, ethylene glycol and propylene glycol.

11. The preparation method of the prussian blue analogue positive electrode material according to claim 8, wherein the gas containing neutral ligand L is a gas formed just by the neutral ligand L itself or a mixed gas formed by the neutral ligand L and an inert gas.

12. The preparation method of the prussian blue analogue positive electrode material according to claim 11, wherein the inert gas is one or more selected from a group consisting of $N_2$, $CO_2$, Ar and He.

13. A electrochemical energy storage device, comprising:

a positive electrode plate comprising a positive electrode current collector and a positive electrode film which is provided to the positive electrode current collector and contains a positive electrode material;

a negative electrode plate; and a separator;

wherein, the positive electrode material comprises the prussian blue analogue positive electrode material according to claim 1.

14. The electrochemical energy storage device according to claim 13, wherein the electrochemical energy storage device is a lithium-ion battery, a sodium-ion battery, a potassium-ion battery, a zinc-ion battery or an aluminum-ion battery.

* * * * *